United States Patent
Kurosawa et al.

(10) Patent No.: US 9,237,136 B2
(45) Date of Patent: Jan. 12, 2016

(54) MAPPING A GLYPH TO CHARACTER CODE IN OBFUSCATED DATA

(71) Applicant: INTERNATIONAL BUSINESS MACHINES CORPORATION, Armonk, NY (US)

(72) Inventors: Ryoji Kurosawa, Tokyo (JP); Yoshinori Tahara, Yamato (JP); Asuka Unno, Tokyo (JP); Natsuki Zettsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/176,629

(22) Filed: Feb. 10, 2014

(65) Prior Publication Data

US 2014/0237241 A1    Aug. 21, 2014

(30) Foreign Application Priority Data

Feb. 19, 2013   (JP) ................................. 2013-030407

(51) Int. Cl.
| | |
|---|---|
| G06F 21/60 | (2013.01) |
| H04L 29/06 | (2006.01) |
| G06F 21/62 | (2013.01) |

(52) U.S. Cl.
CPC .......... H04L 63/0428 (2013.01); G06F 21/602 (2013.01); G06F 21/6209 (2013.01)

(58) Field of Classification Search
None
See application file for complete search history.

(56) References Cited

U.S. PATENT DOCUMENTS

| | | | |
|---|---|---|---|
| 5,003,596 A | 3/1991 | Wood | |
| 6,631,482 B1 * | 10/2003 | Marks | .............................. 714/45 |
| 2002/0101996 A1 | 8/2002 | Takada et al. | |
| 2008/0301431 A1 | 12/2008 | Hea | |
| 2009/0300481 A1 | 12/2009 | Imai | |
| 2010/0306854 A1 | 12/2010 | Neergaard | |
| 2012/0260108 A1 * | 10/2012 | Lee | ............................... 713/191 |
| 2013/0138955 A1 * | 5/2013 | Darcy | ........................... 713/165 |

FOREIGN PATENT DOCUMENTS

| | | |
|---|---|---|
| JP | 3209198 | 7/2001 |
| JP | 2007-102540 A | 4/2007 |
| JP | 2007-272539 A | 10/2007 |
| JP | 2012-529114 A | 11/2012 |

OTHER PUBLICATIONS

Rixco, "Fontect for Web 1.0" Rixco, Rikusuko Co., 2007, pp. 1-3, English Language Translation Attached.

* cited by examiner

*Primary Examiner* — David Pearson
(74) *Attorney, Agent, or Firm* — Law Office of Jim Boice

(57) ABSTRACT

In a font applying device on a client side in a computer system composed of the client and a server, an obfuscated font storing section stores an obfuscated font in which a character different from a character identified by the server based on a character code and having the same width of the character identified by the server is mapped to the character code. An obfuscated document receiving section receives an obfuscated document obtained by obfuscating document data as a result of converting the character code to a character code to which a character identified by the server based on the character code in the document data is mapped in the obfuscated font. A deobfuscation processing section identifies the character mapped in the obfuscated font to a character code included in the obfuscated document, and a display control section controls the display of the character.

6 Claims, 11 Drawing Sheets

| DISPLAY WIDTH (pt) | CHARACTER HAVING THIS WIDTH |
|---|---|
| 6 | . |
| 7 | I i j l |
| 8 | . . / : ; [ ¥ ] f t ! |
| 9 | ! |
| 10 | ( ) - ` r { } |
| 11 | " |
| 12 | * |
| 14 | ^ x |
| 15 | J c k s v y z |
| 16 | a e o |
| 17 | # $ 0 1 2 3 4 5 6 7 8 9 ? L _ b d g h n p q u |
| 18 | + < = > F Z ~ |
| 19 | A T V X Y |
| 20 | & B E K P S |
| 21 | w |
| 22 | C D H N R U |
| 23 | G O Q |
| 25 | M m |
| 27 | % |
| 30 | @ W |

| DISPLAY WIDTH (pt) | CHARACTER HAVING THIS WIDTH |
|---|---|
| 6 | ' |
| 7 | I i j l |
| 8 | , . / : ; [ ¥ ] f t \| |
| 9 | ! |
| 10 | ( ) - ` r { } |
| 11 | " |
| 12 | * |
| 14 | ^ x |
| 15 | J c k s v y z |
| 16 | a e o |
| 17 | # $ 0 1 2 3 4 5 6 7 8 9 ? L _ b d g h n p q u |
| 18 | + < = > F Z ~ |
| 19 | A T V X Y |
| 20 | & B E K P S |
| 21 | w |
| 22 | C D H N R U |
| 23 | G O Q |
| 25 | M m |
| 27 | % |
| 30 | @ W |

FIG. 1

| CHARACTER CODE | CHARACTER |
|---|---|
| : | : |
| 41 | A |
| 42 | B |
| 43 | C |
| 44 | D |
| 45 | E |
| 46 | F |
| 47 | G |
| 48 | H |
| 49 | I |
| 4A | J |
| 4B | K |
| 4C | L |
| 4D | M |
| 4E | N |
| 4F | O |
| 50 | P |
| 51 | Q |
| 52 | R |
| 53 | S |
| 54 | T |
| 55 | U |
| 56 | V |
| 57 | W |
| 58 | X |
| 59 | Y |
| 5A | Z |
| : | : |

FIG. 2A

| CHARACTER CODE | CHARACTER |
|---|---|
| : | : |
| 41 | Y |
| 42 | & |
| 43 | U |
| 44 | C |
| 45 | B |
| 46 | > |
| 47 | Q |
| 48 | D |
| 49 | l |
| 4A | z |
| 4B | E |
| 4C | ? |
| 4D | m |
| 4E | H |
| 4F | G |
| 50 | K |
| 51 | O |
| 52 | N |
| 53 | P |
| 54 | A |
| 55 | R |
| 56 | T |
| 57 | @ |
| 58 | V |
| 59 | X |
| 5A | F |
| : | : |

FIG. 2B

Pojak ]e`aJokf eh O1 1$01,

Ih fga kaJehb pqo`fa`| wa bajlsa`ab
kf`ehd n`e]lf| ao`hlhdk na` kgo`a
ohb ]`aa Jo|okg ]jew d`ewfg, AgIk 202　　　　　　　　　　201

FIG. 3A

Sales forecast on Q2 2012.

In the second quarter, we delivered
strong profit, earnings per share
and free ca|ash flow growth. This 102　　　　　　　　　　101

FIG. 3B

| DISPLAY WIDTH (pt) | HIRAGANA HAVING THIS WIDTH | KATAKANA HAVING THIS WIDTH |
| --- | --- | --- |
| 15 | く | |
| 17 | | ヨ |
| 18 | うよ | ツ |
| 19 | とつり | ミリ |
| 20 | ゆ | ヨ |
| 21 | こさやら | ノヒフヤュ |
| 22 | しそ | カクコタトメラワ |
| 23 | きちままもよるろを | イヴツニスロン |
| 24 | えたこってに | アエオスソチテマモレワ |
| 25 | あいおかけすせぬのひふへむめやわん | ケチナ |
| 26 | なはほゆ | キサシセネハヘホムヤユル |
| 27 | ねみれ | |

FIG. 9

| DISPLAY WIDTH (pt) | NUMBER HAVING THIS WIDTH |
|---|---|
| 13 | 1 |
| 14 |  |
| 15 | 7 |
| 16 | 5 |
| 17 | 2 3 4 6 9 |
| 18 | 0 8 |

FIG. 10

R`kdr enqdb`rs nm P1 1/01-

Hm sgd rdbnmc pt`qsdq+ vd cdkhudqdc rsqnmf oqnehs+ d`qmhmfr odq rg`qd `mc eqdd b`rg 252  251

FIG. 11A

Sales forecast on Q2 2012.

In the second quarter, we delivered strong profit, earnings per share and free caash 152  151

FIG. 11B

MAPPING A GLYPH TO CHARACTER CODE IN OBFUSCATED DATA

This application is based on and claims the benefit of priority from Japan (JP) Patent Application 2013-030407, filed on Feb. 19, 2013, and herein incorporated by reference in its entirety.

BACKGROUND

The present invention relates to an apparatus and method for having a server hold obfuscated data. The present invention particularly relates to an apparatus and method for having a server hold obfuscated data obtained by obfuscating data as a result of converting a character code included in the data.

Recently, online storage services for renting a storage space of a server to receive and hold user data in trust via the Internet have been widely used. Such online storage services are provided on the premise that the service provider is trustworthy and spreading belief is that there is no problem if data is held intact on the server. Therefore, techniques for protecting data held on a server on the faith of the server side have been proposed in the past. Known literature discloses a technique for holding text with various contents posted on a web page to provide the text readable only on an URL that designates encrypted text and makes the encrypted text indecipherable on the other URLs.

On the other hand, in an online storage service using a SaaS (Software as a Service) based application, a service provider may be untrusted. In such a case, when data held on a server contains confidential information such as business secrets and personal information, there arises a problem that these pieces of information leak out to the service provider. Therefore, techniques for preventing confidential information held on the server from leaking out to the service provider are also proposed.

SUMMARY

According to one embodiment of the present invention, an apparatus for having a server hold obfuscated data obtained by obfuscating data as a result of converting a character code included in the data comprises: a mapping information storage device for storing mapping information indicating that a second glyph is mapped to the character code, wherein the second glyph is a glyph different from a first glyph identified by the server based on the character code and having a width identical to the first glyph; a receiving hardware device for receiving, from the server, the obfuscated data obtained by obfuscating the data as a result of converting the character code included in the data to a character code to which a glyph identified by the server, based on the character code included in the data, is mapped as the second glyph in the mapping information; an identification hardware device for identifying the glyph mapped as the second glyph in the mapping information to a character code included in the obfuscated data received from the receiving section; and a display for displaying the glyph identified by the identification hardware device.

According to one embodiment of the present invention, an apparatus for having a server hold obfuscated data obtained by obfuscating data as a result of converting a character code included in the data comprises: a mapping information storage device for storing mapping information indicating that a second glyph is mapped to the character code, wherein the second glyph is a glyph different from a first glyph identified by the server based on the character code and having a width identical to the first glyph; an acquisition logic for acquiring the data according to a user operation; an obfuscation logic for obfuscating the data as a result of converting a character code included in the data acquired by the acquisition section to a character code to which a glyph identified by the server based on the character code included in the data is mapped as the second glyph in the mapping information; and a sending hardware device for sending the server the obfuscated data obtained by the obfuscation section obfuscating the data.

According to one embodiment of the present invention, a method of having a server hold obfuscated data obtained by obfuscating data as a result of converting a character code included in the data comprises: storing, by one or more processors, mapping information indicating that a second glyph is mapped to the character code, wherein the second glyph is a glyph different from a first glyph identified by the server based on the character code and having a width identical to the first glyph; receiving, from the server, the obfuscated data obtained by obfuscating the data as a result of converting the character code included in the data to a character code to which a glyph identified by the server based on the character code included in the data is mapped as the second glyph in the mapping information; identifying, by one or more processors, the glyph mapped as the second glyph in the mapping information to a character code included in the obfuscated data received from the receiving section; and displaying, on a display, the identified glyph.

BRIEF DESCRIPTION OF THE SEVERAL VIEWS OF THE DRAWINGS

FIG. 1 is a table showing information defining, for each display width, characters having the display width.

FIGS. 2A-2B contain tables showing an example of mapping between a character code and a glyph included in the normal font and an example of mapping between a character code and a glyph included in an obfuscated font to maintain each display width.

FIGS. 3A-3B contain diagrams specifically showing the effect of obfuscation using the obfuscated font to maintain the display width.

FIG. 9 is a table showing information defining, for each display width used in a first modification, characters having the display width.

FIG. 10 is a table showing information defining, for each display width used in a second modification, characters having the display width.

FIGS. 11A-11B contain diagrams specifically showing a problem when obfuscation is simply performed.

DETAILED DESCRIPTION

Figure 4:
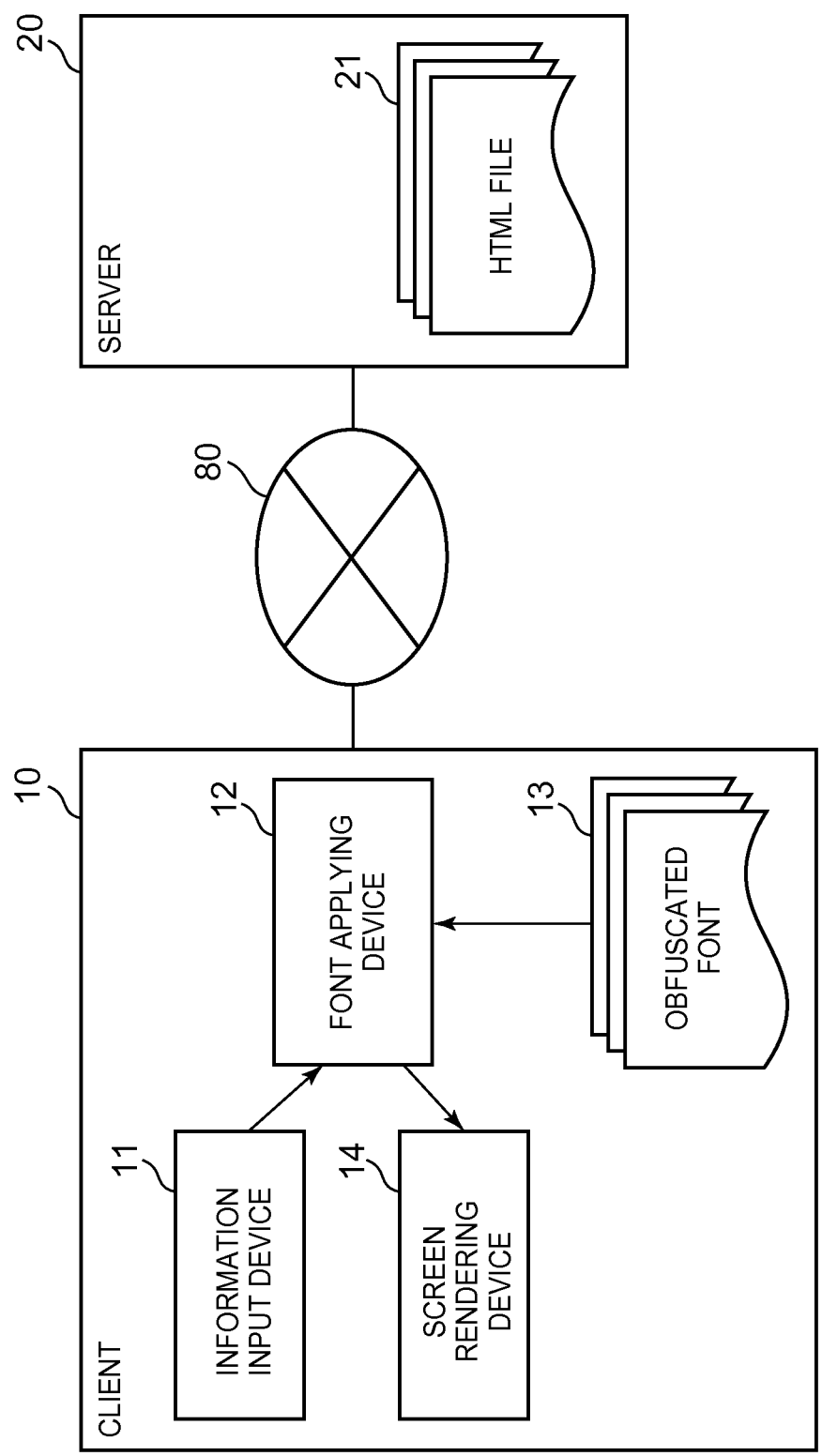
FIG. 4 is a block diagram showing a configuration example of a computer system to which an embodiment of the present invention is applied.

A preferred embodiment will be described in detail below with reference to the accompanying drawings. In the embodiment, data obfuscated using an obfuscated font on a client side (hereinafter called "obfuscated data") is sent to a server side on the grounds that information may leak out to the server side if data is sent intact. Here, the obfuscated font means a font different from normal in terms of mapping between a character code and a glyph. Using this obfuscated font, characters on display are replaced to obfuscate data. In fact, since mapping between a character code and a glyph is changed in the obfuscated font, the data sent to the server side will look like a meaningless character string unless the mapping is known.

However, when such obfuscation is simply performed, there arises a problem in use of an application. When a web application is executed, a web browser receives, from the server side, code that runs on the client side such as JavaScript (registered trademark) to process the code. Processing relating to a layout on a screen is written in this code. When characters on display are replaced using the obfuscated font, normal processing is not performed because the code cannot recognize character differences.

FIGS. 11A-11B contain diagrams specifically showing a problem when obfuscation is simply performed. FIG. 11A shows a screen assumed by the code of the web application, and FIG. 11B shows a screen viewed by a user. In FIG. 11B, since there is a case where the width of a character is different from the width of a corresponding character in FIG. 11A, the layout is disrupted. Specifically, for example, the right end of the longest line is located at the position indicated by a broken line 251 in FIG. 11A and at the position indicated by a broken line 151 in FIG. 11B. As will be apparent from the fact that these positions are misaligned, the line lengths are different on the whole. Further, the cursor is displayed between characters in FIG. 11A as indicated by a cursor 252, while the cursor is displayed in a character in FIG. 11B as indicated by a cursor 152. In addition, the cursor is displayed just behind a character that disappears with a press of the backspace key in FIG. 11A, while an unexpected operation may be performed in FIG. 11B because the relationship between the character and the display position of the cursor is disrupted. For example, when the backspace key is pressed to correct "caash" to "cash" in FIG. 11B, "e" in "free" disappears.

Therefore, in the embodiment, such an obfuscated font to maintain the display width of the glyph despite of the difference from normal in mapping between the character code and the glyph is prepared, and obfuscated data obfuscated using the obfuscated font is sent to the server. Thus, the display layout is prevented from being disrupted on the client side while making it difficult to deobfuscate data stored on the server.

Specifically, mapping for obfuscation with maintaining each display width is created. First, a method of creating such mapping will be described. FIG. 1 is a table defining, for each display width, characters having the display width. This table shows correspondences between display widths and characters in the case of 30-pt Arial font. In the embodiment, a character is normally mapped to another character represented by a character code having the same display width as the character based on this definition. For example, characters "A", "T", "V", "X" and "Y" are defined for a display width of 19 pt. Therefore, under normal conditions, character "Y" is mapped to a character code representing character "A", character "A" is mapped to a character code representing character "T", character "T" is mapped to a character code representing character "V", character "V" is mapped to a character code representing character "X", and character "X" is mapped to a character code representing character "Y", respectively. Further, characters "M" and "m" are defined for a display width of 25 pt. Therefore, under normal conditions, character "m" is mapped to a character code representing character "M", and character "M" is mapped to a character code representing character "m", respectively. In regard to the other display widths, mapping is done between characters of the same display width, i.e., a character is normally mapped to a character code representing another character.

FIGS. 2A-2B contains tables illustrating mapping between a character code and a glyph. A "glyph" is defined as a pictograph or other symbolic character or sign. Note that FIGS. 2A-2B shows only portions corresponding to character codes "41" to "5A". FIG. 2A shows an example of mapping in a normal font. Here, as mapping in the normal font, commonly available mapping is used, but unique mapping may be used for a server to which the mapping may not be commonly available. On the other hand, FIG. 2B shows an example of mapping in an obfuscated font that maintains each display width. The obfuscated font is created by changing a character represented by a character code in the mapping in FIG. 2A to another character of the same display width. For example, as enclosed by the bold line, character code "41" represents character "A", character code "54" represents character "T", character code "56" represents character "V", character code "58" represents character "X", and character code "59" represents character "Y" in FIG. 2A, respectively, while character code "41" represents character "Y", character code "54" represents character "A", character code "56" represents character "T", character code "58" represents character "V", and character code "59" represents character "X" in FIG. 2B, respectively. Further, as enclosed by the bold broken line, character code "4D" represents character "M" in FIG. 2A, but character code "4D" represents character "m" in FIG. 2B. In this case, as not shown, character code "6D" is changed to represent character "M" in FIG. 2B from character "m" in FIG. 2A. In regard to the other display widths, a character represented by a character code is changed to another character of the same display width.

FIGS. 3A-3B contain diagrams specifically showing the effect of obfuscation using the obfuscated font with the display width maintained therein. FIG. 3A shows a screen assumed by the code of the web application, and FIG. 3B shows a screen viewed by the user. Since the width of characters is maintained between FIG. 3A and FIG. 3B, layout disruption can be prevented. Specifically, for example, the right end of the longest line is located at the position indicated by a broken line 201 in FIG. 3A and at the position indicated by a broken line 101 in FIG. 3B. As will be apparent from the fact that these are located at the same position, the line lengths are equal to each other on the whole. Further, both cursors are displayed between characters as indicated by a cursor 202 in FIG. 3A and a cursor 102 in FIG. 3B. In addition, the cursors are displayed just behind characters that disappear with a press of the backspace key in both FIG. 3A and FIG. 3B. Therefore, for example, when the backspace key is pressed to correct "caash" to "cash" in FIG. 3B, a correct operation is so performed that "a" in "caash" will disappear.

The embodiment for performing such a general operation will be described in detail below. In the embodiment, any data created by business software, such as word-processing software, spreadsheet software, or presentation software, may be targeted for obfuscation, but the following description particularly assumes a case where document data created by word-processing software is targeted for obfuscation. FIG. 4 is a block diagram showing a configuration example of a computer system to which the embodiment is applied. As shown, this computer system is so configured that a client 10 and a server 20 are connected through a network 80 such as the Internet.

The client 10 is a computer used by a user, and a web browser used by the user to browse document data is installed thereon. To be more specific, the client 10 includes an information input device 11, a font applying device 12, an obfuscated font 13, and a screen rendering device 14. The information input device 11 is a device used by the user to enter information such as a keyboard. The font applying device 12 is a device for applying an obfuscated font 13 to document data input from the information input device 11 to generate obfuscated document data (hereinafter called "obfuscated document"), and applying the obfuscated font 13 to obfuscated document sent from the server 20 to deobfuscate the obfuscated document. The font applying device 12 is implemented by an add-on or a plug-in, a custom style sheet, and the like. The obfuscated font 13 is a font applied in the font applying device 12 to obfuscate document data input from the information input device 11 and deobfuscate an obfuscated document sent from the server 20, including mapping to maintain the display width as particularly shown in FIG. 2B in the embodiment. The obfuscated font 13 is prepared for each kind and size of font such as "ObfuscatedArial10.ttf" in the case of 10-pt Arial font and "ObfuscatedArial12.ttf" in the case of 12-pt Arial font. The screen rendering device 14 is a device for rendering, onto the screen, information output from the font applying device 12, such as a liquid crystal display.

The server 20 is a computer for holding document data, on which a web server is installed to execute a web application upon request from a web browser and return the execution results to the web browser. To be more specific, the server 20 includes an HTML (HyperText Markup Language) file 21. The HTML file 21 includes JavaScript (registered trademark) to perform processing relating a layout on the web browser when the user logs into the web application and opens an editable document, and data on the document opened by the user. The HTML file 21 is sent from the web server to the web browser.

Figure 5:
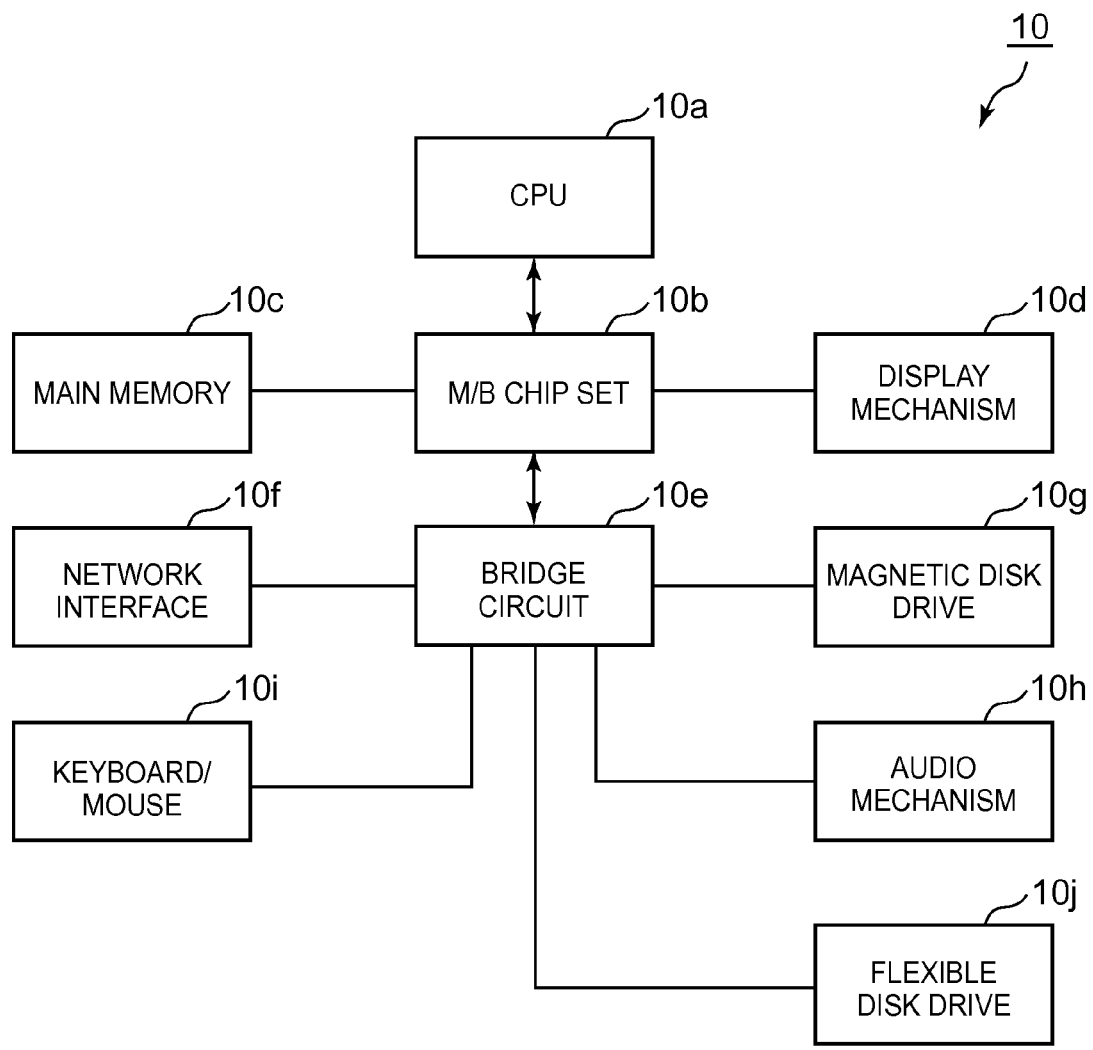
FIG. 5 is a block diagram showing an example of the hardware configuration of a computer to which the embodiment of the present invention is applicable.

Next, among the computers that make up this computer system, the client 10 will be described in more detail. FIG. 5 is a block diagram showing an example of the hardware configuration of the client 10. As shown, the client 10 includes a CPU (Central Processing Unit) 10a as computing means, a main memory 10c connected to the CPU 10a through an M/B (motherboard) chip set 10b, and a display mechanism 10d connected to the CPU 10a also through the M/B chip set 10b. Connected to the M/B chip set 10b through a bridge circuit 10e are a network interface 10f, a magnetic disk drive (HDD) 10g, an audio mechanism 10h, a keyboard/mouse 10i, and a flexible disk drive 10j. Among these components, the display mechanism 10d corresponds to the screen rendering device 14 in FIG. 4, and the keyboard/mouse 10i corresponds to the information input device 11 in FIG. 4.

In FIG. 5, each component is connected through a bus. For example, the connection between the CPU 10a and the M/B chip set 10b, and the connection between the M/B chip set 10b and the main memory 10c are made through a CPU bus. The connection between the M/B chip set 10b and the display mechanism 10d may be made through an AGP (Accelerated Graphics Port). However, when the display mechanism 10d includes a PCI Express video card, the connection between the M/B chip set 10b and this video card is made through a PCI Express (PCIe) bus. In the case of connection to the bridge circuit 10e, PCI Express can be used, for example, for the network interface 10f. Further, serial ATA (AT Attachment), parallel transfer ATA, or PCI (Peripheral Components Interconnect) can be used, for example, for the magnetic disk drive 10g. Further, USB (Universal Serial Bus) can be used for the keyboard/mouse 10i and the flexible disk drive 10j.

Figure 6:
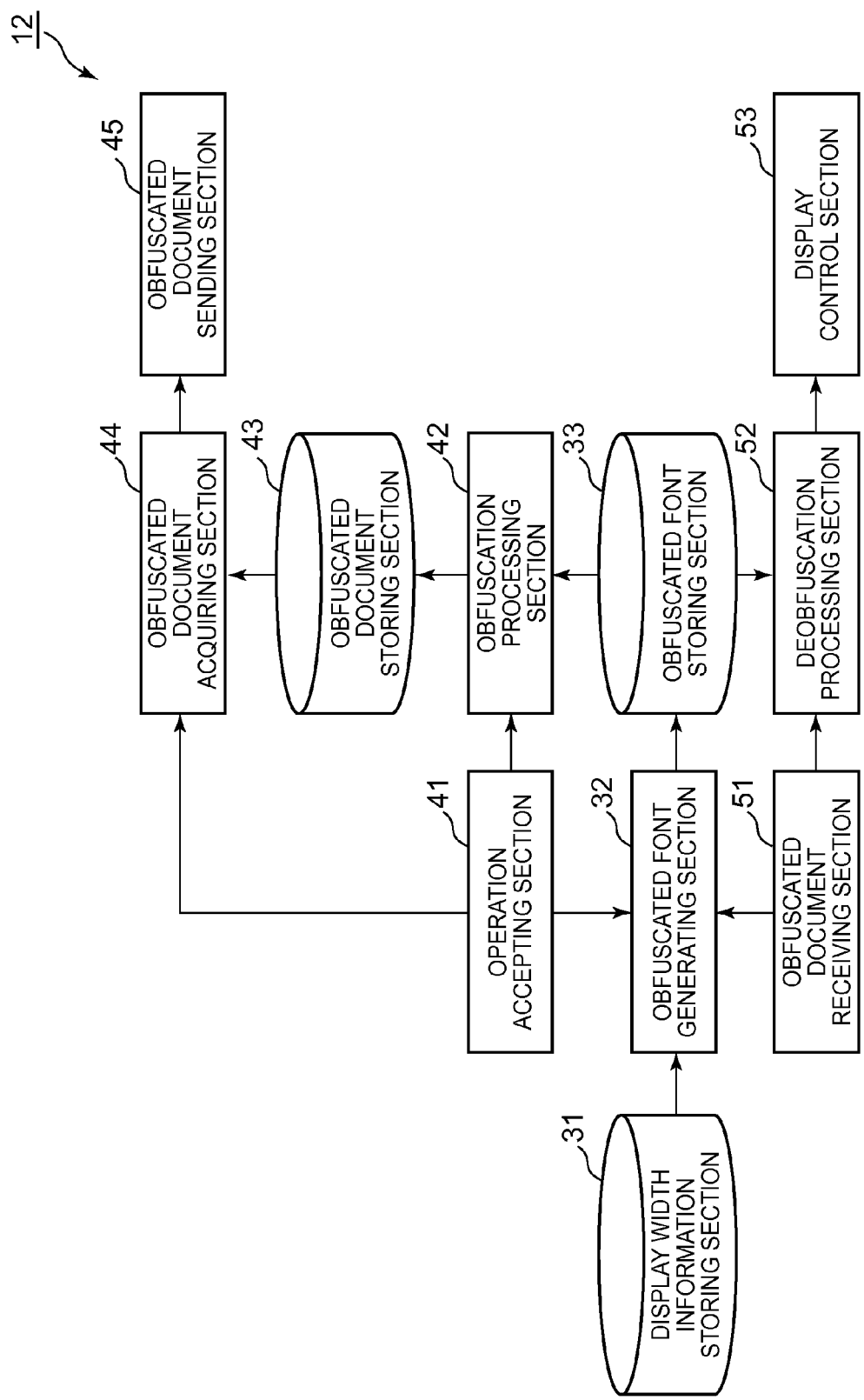
FIG. 6 is a block diagram showing a functional configuration example of a font applying device in the embodiment of the present invention.

FIG. 6 is a block diagram showing a functional configuration example of the font applying device 12 among the components of the client 10. The obfuscated font 13 is illustrated outside of the font applying device 12 in FIG. 4, but the font applying device 12 will be described here as including the obfuscated font 13. As shown, the font applying device 12 includes a display width information storing section 31, an obfuscated font generating section 32, and an obfuscated font storing section 33. The font applying device 12 also includes an operation accepting section 41, an obfuscation processing section 42, an obfuscated document storing section 43, an obfuscated document acquiring section 44, and an obfuscated document sending section 45. The font applying device 12 further includes an obfuscated document receiving section 51, a deobfuscation processing section 52, and a display control section 53.

The display width information storing section 31 stores display width information in which each character display width is associated with characters having the display width. For example, this display width information corresponds to the information shown in FIG. 1. In the embodiment, the display width information is used as an example of definition information in which multiple glyphs having a width are defined for the glyph width, and the display width information storing section 31 is provided as an example of a definition information storing section for storing the definition information.

The obfuscated font generating section 32 generates an obfuscated font based on the display width information stored in the display width information storing section 31. Specifically, one of characters associated with the character display width in the display width information is mapped to a character code instead of a character normally represented by the character code to generate the obfuscated font. When document data input from the information input device 11 is obfuscated, the obfuscated font generating section 32 may dynamically generate an obfuscated font using an attribute of the document data, while when an obfuscated document sent from the server 20 is deobfuscated, the obfuscated font generating section 32 may dynamically generate an obfuscated font using the attribute of the obfuscated document. In the embodiment, the obfuscated font is used as an example of mapping information in which, instead of a first glyph identified by the server based on the character code, a second glyph as a glyph other than the first glyph among multiple glyphs defined for a glyph width of the first glyph in the definition information is mapped to the character code, and the obfuscated font generating section 32 is provided as an example of a generation section for generating mapping information.

The obfuscated font storing section 33 stores the obfuscated font generated by the obfuscated font generating section 32. As mentioned above, this obfuscated font is a font to maintain the display width of characters, and those including mapping as shown in FIG. 2B are stored for each kind and size of character. In the embodiment, the obfuscated font storing section 33 is provided as an example of a mapping information storing section for storing mapping information.

The operation accepting section 41 accepts a user operation for entering document data using the information input device 11 or a user operation for giving instructions to read and send an obfuscated document to the server 20. In the embodiment, the operation accepting section 41 is provided as an example of an acquisition section for acquiring data.

When the operation accepting section 41 accepts the user operation for entering document data, the obfuscation processing section 42 converts the character code of each character included in the input document data based on the obfuscated font stored in the obfuscated font storing section 33 to generate an obfuscated document. Specifically, the obfuscation processing section 42 converts the character code of each character to a character code to which a character normally represented by this character code is mapped in the obfuscated font. In the embodiment, the obfuscation processing section 42 is provided as an example of an obfuscation section for obfuscating data. The obfuscated document storing section 43 stores the obfuscated document generated by the obfuscation processing section 42.

When the operation accepting section 41 accepts the user operation for giving instructions to read and send the obfuscated document to the server 20, the obfuscated document acquiring section 44 acquires the obfuscated document stored in the obfuscated document storing section 43. When the obfuscated document acquiring section 44 acquires the obfuscated document, the obfuscated document sending section 45 sends this obfuscated document to the server 20. In the embodiment, the obfuscated document is used as an example of obfuscated data obtained by the obfuscation section obfuscating data, and the obfuscated document sending section 45 is provided as an example of a sending section for sending obfuscated data to the server.

The obfuscated document receiving section 51 receives an obfuscated document sent from the server 20 upon request from the client 10 based on the user operation. In the embodiment, the obfuscated document receiving section 51 is provided as an example of a receiving section for receiving obfuscated data from the server.

Based on the obfuscated font stored in the obfuscated font storing section 33, the deobfuscation processing section 52 identifies a character represented by the character code of each character included in the obfuscated document received by the obfuscated document receiving section 51. Specifically, the character represented by the character code of each character is set to a character mapped to this character code in the obfuscated font. In the embodiment, the deobfuscation processing section 52 is provided as an example of an identification section (i.e., identification hardware device) for identifying a glyph mapped in the mapping information to a character code included in obfuscated data.

The display control section 53 controls characters identified by the deobfuscation processing section 52 to be displayed on the screen rendering device 14. In the embodiment, the display control section 53 is provided as an example of a display section for displaying glyphs.

These functional sections are implemented by cooperation between software and hardware resources. Specifically, the CPU 10a (see FIG. 5) reads a program for implementing the obfuscated font generating section 32, the operation accepting section 41, the obfuscation processing section 42, the obfuscated document acquiring section 44, the obfuscated document sending section 45, the obfuscated document receiving section 51, the deobfuscation processing section 52, and the display control section 53 from, for example, the magnetic disk drive 10g (see FIG. 5) into the main memory 10c (see FIG. 5), and executes the program to implement these functional sections. Further, the display width information storing section 31, the obfuscated font storing section 33, and the obfuscated document storing section 43 are implemented, for example, by the magnetic disk drive 10g (see FIG. 5).

Figure 7:
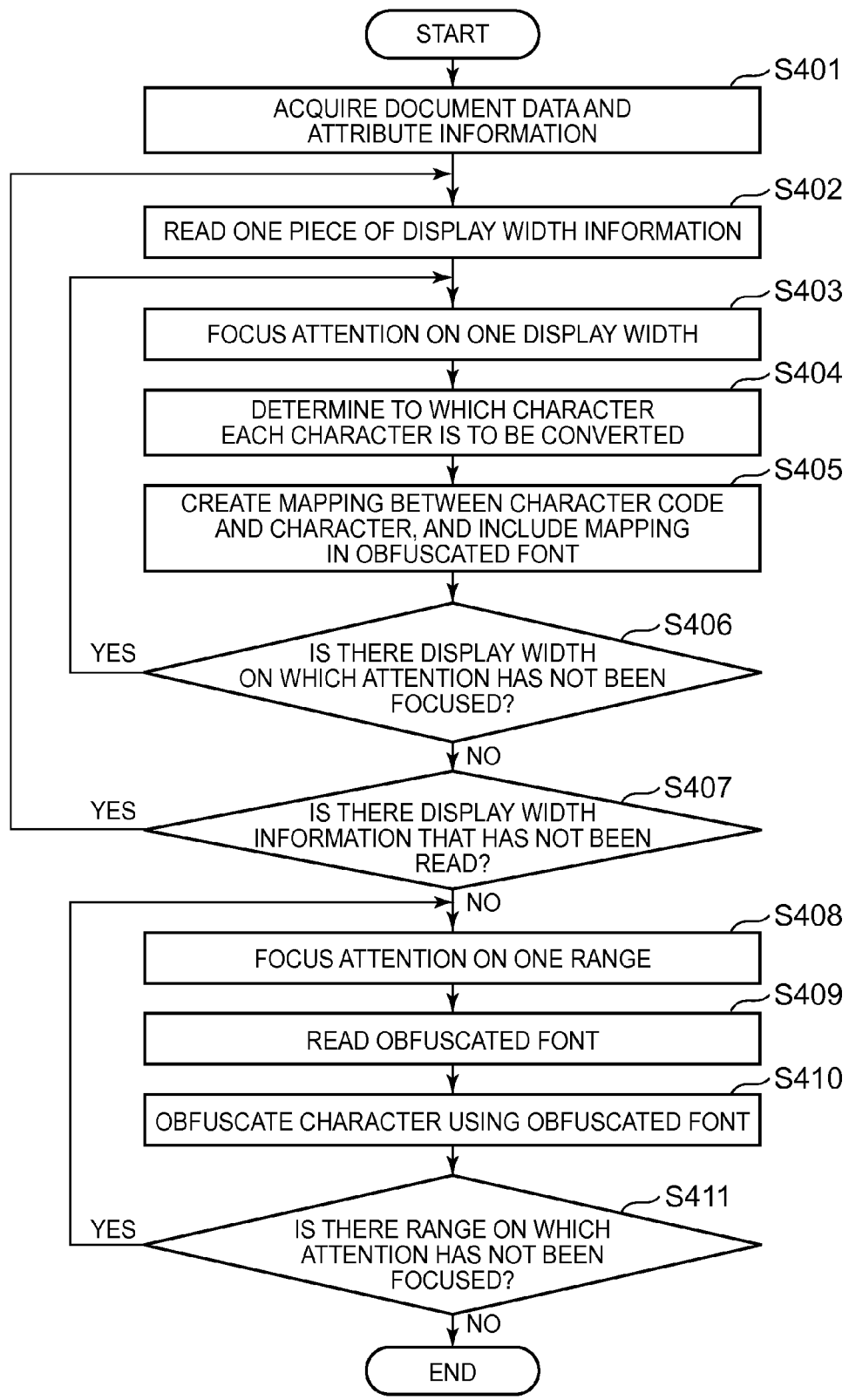
FIG. 7 is a flowchart showing an operation example when the font applying device obfuscates document data in the embodiment of the present invention.

Next, the operation of the font applying device 12 shown in FIG. 6 will be described in detail. FIG. 7 is a flowchart showing an operation example when the font applying device 12 applies an obfuscated font to document data input from the information input device 11 to generate an obfuscated document. As shown, in the font applying device 12, the operation accepting section 41 first acquires input document data and attribute information on the document data according to the user operation for entering the document data and the attribute information from the information input device 11 (step 401). Here, the attribute information includes font information composed of information indicative of a range for each range of document data and information indicative of the kind and size of font used in the range, and associated information used for generation of an obfuscated font. Among these pieces of information, the associated information is the name of the document data (document name), the created data and time of the document data, or the like. Thus, the document data and the attribute information (the font information and the associated information) are passed from the operation accepting section 41 to the obfuscated font generating section 32, and the document data and the attribute information (only the font information) are passed from the operation accepting section 41 to the obfuscation processing section 42.

Next, the obfuscated font generating section 32 focuses attention on a kind and size of font used in one range among the kinds and sizes of fonts included in the font information passed from the operation accepting section 41 to read, from the display width information storing section 31, display width information corresponding to this kind and size of font (step 402). Then, the obfuscated font generating section 32 focuses attention on one display width among display widths included in the display width information (step 403) to determine to which character each character of multiple characters defined for this display width is to be converted (step 404).

In this regard, any method may be used to determine to which character each character is to be converted. In other words, any selection method may be used to select a character after conversion of each character from among multiple characters of the same display width. For example, the selection can be made by a selection method according to the associated information passed from the operation accepting section 41. Here, a case is considered where it is determined by how many characters each character is to be moved to the right, and each character is converted to a character obtained by moving each character to the right by the determined number of characters (where it is assumed that a character obtained by moving the rightmost character to the right by one character is the leftmost character). In this case, the associated information passed from the operation accepting section 41 is used to determine by how many characters each character is to be moved to the right. It is assumed that the document name is used as the associated information. If the length of the document name is denoted by L and the number of characters defined for the character width is denoted by N ($N \neq 1$), the number of characters S to move to the right can be determined as "$S = L \bmod(N-1) + 1$", for example. If the determination is made by such an equation, the number of characters S to move to the right will never become zero, taking any of values from 1 to N−1. Therefore, each character is always replaced by another character except for a character having a display width for which only one character is defined. Further, since the number of characters S to move to the right is determined based on the attribute of the document data, there is also no need to store the document data on the client 10 side while the document data is held on the server 20. For example, five characters are defined for a display width of 19 pt in FIG. 1, N=5. If the document name is eight characters, that is, if L=8, S=1. In this case, character "A" is converted to character "T", character "T" is converted to character "V", character "V" is converted to character "X", character "X" is converted to character "Y", and character "Y" is converted to character "A", respectively. On the other hand, if the crated data and time of the document data is used as the associated information, the number of characters S to move to the right can be determined by a similar equation in which a serial value obtained by converting the created data and time starting at a certain time is denoted by L. Even if any other information is used as the associated information, the number of characters S to move to the right can be determined by the same idea.

Next, the obfuscated font generating section 32 creates mapping between a character code and each character based on the determination in step 404, and includes the mapping in the obfuscated font (step 405). Specifically, if it is determined in step 404 that a first character is converted to a second character, mapping between a character code, mapped to the second character in the normal font, and the first character is created, and the mapping is included in the obfuscated font. For example, in regard to the display width of 19 pt in FIG. 1, it is determined that character "A" is converted to character "T", character "T" is converted to character "V", character "V" is converted to character "X", character "X" is converted to character "Y", and character "Y" is converted to character "A", respectively. Therefore, mapping between character code "54" mapped to character "T" in the normal font and character "A", mapping between character code "56" mapped to character "V" in the normal font and character "T", mapping between character code "58" mapped to character "X" in the normal font and character "V", mapping between character code "59" mapped to character "Y" in the normal font and character "X", and mapping between character code "41" mapped to character "A" in the normal font and character "Y" are created.

After that, the obfuscated font generating section 32 determines whether there is any display width on which attention has not been focused yet among the display widths included in the display width information (step 406). When it is determined that there is a display width on which attention has not been focused, the procedure returns to step 403, while when it is determined that there is no display width on which attention has not been focused, it is then determined whether there is any piece of display width information that has not been read yet among the pieces of display width information (step 407). As a result, when it is determined that there is a piece of display width information that has not been read, the procedure returns to step 402.

On the other hand, when it is determined that there is no display width information that has not been read, the obfuscation processing section 42 focuses attention on one range included in the font information passed from the operation accepting section 41 (step 408) to read, from the obfuscated font storing section 33, an obfuscated font corresponding to the kind and size of font associated with this range in the font information (step 409). Then, the obfuscation processing section 42 applies the obfuscated font read in step 409 to characters in the range of the document data passed from the operation accepting section 41 to obfuscate the characters (step 410). For example, if a certain portion of the document data passed from the operation accepting section 41 is a character string "T", "A", and "X", the portion is obfuscated as a result of converting the character string to a character code string "56", "54", and "59".

After that, the obfuscation processing section 42 determines whether there is any range on which attention has not been focused yet among the ranges included in the font information (step 411). When it is determined that there is a range on which attention has not been focused, the procedure returns to step 408, while when there is no range on which attention has not been focused, the processing is ended.

When characters in all the ranges of the document data are thus obfuscated, the entire document data is stored as an obfuscated document in the obfuscated document storing section 43. After that, with the user operation for giving instructions to read and send the obfuscated document to the server 20, the obfuscated document acquiring section 44 reads the obfuscated document from the obfuscated document storing section 43, and the obfuscated document sending section 45 sends the read obfuscated document to the server 20. This results in storing the obfuscated document on the server 20. Here, since the data stored on the server 20 is displayed using the normal font, any user who accesses the server 20 to try to browse this obfuscated document can view only a meaningless character string. For example, even if browsing the obfuscated document in which the character string of "T", "A", and "X" has been converted to the character code string of "56", "54", and "59", the user can only view a character string of "V", "T", and "Y".

Figure 8:
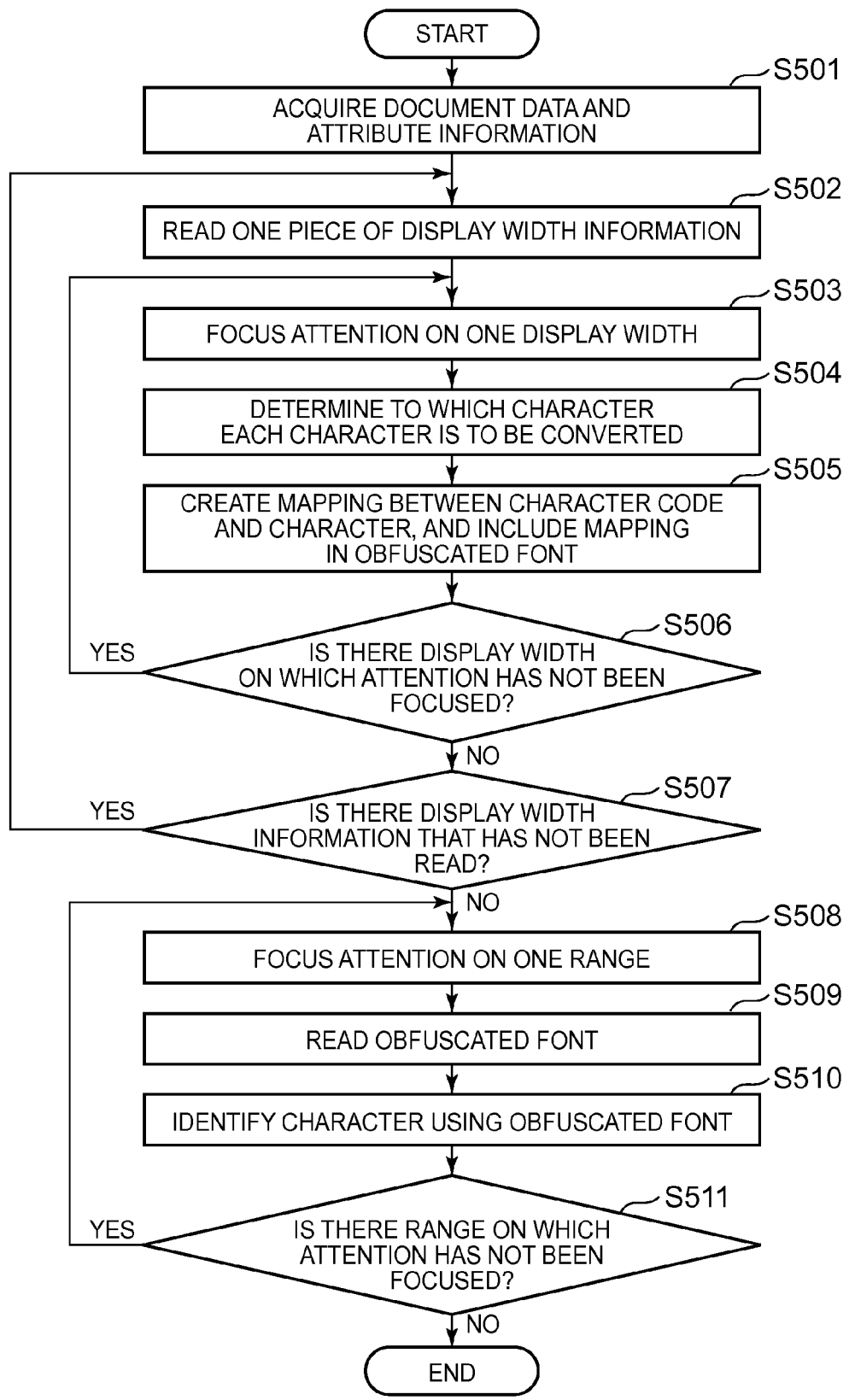
FIG. 8 is a flowchart showing an operation example when the font applying device deobfuscates document data in the embodiment of the present invention.

FIG. 8 is a flowchart showing an operation example when the font applying device 12 applies the obfuscated font to document data sent from the server 20 to make the display of the document data readable. First, when the user logs into the web application and opens the obfuscated document held on the server 20, the web server sends the web browser an HTML file including JavaScript (registered trademark) code with the obfuscated document further included therein. This causes the font applying device 12 to execute processing steps 501 to 507. Since the processing steps 501 to 507 are the same as steps 401 to 407 in FIG. 7 except for the points that the operating entity of executing step 501 is the obfuscated document receiving section 51 and that the document data and the attribute information used in steps 502 to 507 are passed from the obfuscated document receiving section 51, the description thereof will be omitted here.

Upon completion of the processing steps 501 to 507, the deobfuscation processing section 52 focuses attention on one range included in the font information passed from the obfuscated document receiving section 51 (step 508) to read, from the obfuscated font storing section 33, an obfuscated font corresponding to the kind and size of font corresponding to this range in the font information (step 509). Then, the deobfuscation processing section 52 identifies each character represented by a character code in the range of the obfuscated document passed from the obfuscated document receiving section 51 based on the obfuscated font read in step 509 (step 510). For example, when a certain portion of the obfuscated document passed from the obfuscated document receiving section 51 is a character code string "56", "54", and "59", a character string representing a corresponding portion of the document data is identified as "T", "A", and "X".

After that, the deobfuscation processing section 52 determines whether there is any range on which attention has not been focused yet among the ranges included in the font information (step 511). When it is determined that there is a range on which attention has not been focused, the procedure returns to step 508, while when it is determined that there is no range on which attention has not been focused, the processing is ended.

When characters represented by character codes in all the ranges of the document data are thus identified, the identified characters are supplied to the display control section 53. Then, the display control section 53 controls the screen rendering device 14 to render the characters.

In the embodiment, characters in all the ranges of the document data are obfuscated, but characters in some of the ranges of the document data may be obfuscated. In this case, it would be better to receive an URL (Uniform Resource Locator) where the obfuscated document is stored after the obfuscated document is sent to the server 20 and to store, in a memory, not shown, the URL in association with information indicative of the obfuscated range of the document data. Then, when the obfuscated document is received from the server 20, it would be better to use the obfuscated font in only the range indicated by the information stored in the memory, not shown, in association with the URL where the obfuscated document is stored in order to display the characters.

Further, in the embodiment, all characters are obfuscated regardless of the attribute of the document data, but the characters may be divided into characters to be obfuscated and characters that are not obfuscated depending on the attribute of the document data. For example, the kind of document data may be set as the attribute of the document data to determine whether to obfuscate each character for each type of character according to the kind of document data.

The following will describe such embodiments as modifications of the embodiment. As a first modification, a case is considered where document data is a Japanese document written in Japanese. In this case, characters for each kind of character, such as Hiragana, Katakana, or Kanji, may be different in width depending on the font. FIG. 9 is a table that defines, for each display width used in the first modification, characters having the display width. In this font, Hiragana and Katakana include characters of multiple display widths (since all Kanji characters are assumed to be of the same display width, Kanji is not shown). In this case, for example, a Hiragana character is replaced by another Hiragana character, a Katakana character is replaced by another Katakana character, and a Kanji character is replaced by another Kanji character to enable obfuscation of characters with their original appearance more preserved.

As a second modification, a document with numbers taking on major significance (e.g., financial statements) is considered. In this case, numbers of the same display width can be replaced by each other to make it hard even to figure out at a glance if the numbers are obfuscated. FIG. 10 is a table that defines, for each display width used in the second modification, characters having the display width. Using this definition, for example, the sentence "X company expects 2012 GAAP EPS of $14.29+" is obfuscated as "X company expects 3813 GAAP EPS of $16.32+".

As described above, the embodiment is such that an obfuscated font to maintain the display width of each glyph despite of a difference from normal in mapping between a character code and the glyph is prepared, and obfuscated data obfuscated using such an obfuscated font is held on a server. This can reduce the possibility of data leakage to the server side and prevent layout disruption when the data is received from the server and displayed.

A previous publication discloses a method of obfuscating data, which includes: reading values occurring in one or more fields of multiple records from a data source; storing a key value; for each of the multiple records, generating an obfuscated value to replace an original value in a given field of each of the multiple records using the key value so that the obfuscated value will depend on the key value and be deterministically related to the original value; and storing a collection of obfuscated values including records that include obfuscated values in a data storage system.

Another previous publication discloses a security device including a storage device for storing a conversion table with rules of data conversion described therein, and a data converting part for receiving input data input from an input device and converting the input data using the conversion table, wherein the converted data is sent to an application server to have the application server manage the converted data.

Another previous publication discloses a character string conversion device. The character string conversion device stores, in a program memory, multiple programs as conversion processing means and multiple tables as conversion character lists. In the character string conversion device, it is determined whether a character contained in a designated mask range matches a character contained in each table, and when both match, the character is converted to another character in the corresponding table according to predefined conversion rules. Further, as restoration processing, each converted character string is restored to a character string before conversion according to the conversion rules.

As just described, there have already existed techniques for converting characters included in data and having a server hold the characters. However, when such a conversion of characters is simply performed, there arises a problem that the layout may be disrupted in an application through which characters are directly entered due to a difference in length between a character string before conversion and a character string after conversion, causing inconvenience in use. Here, since a service for receiving and holding user data in trust is provided by a third party, processing on the server side cannot be changed. Note that none of the technique in the prior art presents a solution to such a problem.

It is an object of the present invention to reduce the possibility of data leakage to a server side in having the server hold data and to prevent layout disruption when the data is received from the server and displayed.

Under the above object, the present invention provides an apparatus for having a server hold obfuscated data obtained by obfuscating data as a result of converting a character code included in the data, including: a mapping information storing section for storing mapping information indicating that a second glyph is mapped to the character code, wherein the second glyph is a glyph different from a first glyph identified by the server based on the character code and having the same width as the first glyph; a receiving section for receiving, from the server, the obfuscated data obtained by obfuscating the data as a result of converting the character code included in the data to a character code to which a glyph identified by the server based on the character code included in the data is mapped as the second glyph in the mapping information; an identification hardware device for identifying the glyph mapped as the second glyph in the mapping information to a character code included in the obfuscated data received from the receiving section; and a display section for displaying the glyph identified by the identification hardware device.

This apparatus may be configured to further include an acquisition section for acquiring the data according to a user operation, an obfuscation section for obfuscating the data as a result of converting a character code included in the data acquired by the acquisition section to a character code to which a glyph identified by the server based on the character code included in the data is mapped as the second glyph in the mapping information, and a sending section for sending the server the obfuscated data obtained by the obfuscation section obfuscating the data. This apparatus may also be configured to further include a definition information storing section for storing definition information defining, for a glyph width, multiple glyphs having the width; and a generation section for generating the mapping information by mapping a glyph other than the first glyph among the multiple glyphs, defined for the width of the first glyph in the definition information, to the character code as the second glyph instead of the first glyph identified by the server based on the character code. The generation section may use a selection method according to an attribute of the data to select the glyph other than the first glyph from among the multiple glyphs defined for the width of the first glyph in the definition information. The generation section may also generate the mapping information for each type of character according to the attribute of the data.

The present invention also provides an apparatus for having a server hold obfuscated data obtained by obfuscating data as a result of converting a character code included in the data, including: a mapping information storing section for storing mapping information indicating that a second glyph is mapped to the character code, wherein the second glyph is a glyph different from a first glyph identified by the server based on the character code and having the same width as the first glyph; an acquisition section for acquiring the data according to a user operation; an obfuscation section for obfuscating the data as a result of converting a character code included in the data acquired by the acquisition section to a character code to which a glyph identified by the server based on the character code included in the data is mapped as the second glyph in the mapping information; and a sending section for sending the server the obfuscated data obtained by the obfuscation section obfuscating the data.

The present invention further provides a method of having a server hold obfuscated data obtained by obfuscating data as a result of converting a character code included in the data, including: storing mapping information indicating that a second glyph is mapped to the character code, wherein the second glyph is a glyph different from a first glyph identified by the server based on the character code and having the same width as the first glyph; receiving, from the server, the obfuscated data obtained by obfuscating the data as a result of converting the character code included in the data to a character code to which a glyph identified by the server based on the character code included in the data is mapped as the second glyph in the mapping information; identifying the glyph mapped as the second glyph in the mapping information to a character code included in the obfuscated data received from the receiving section; and displaying the identified glyph.

Further, the present invention provides a program for causing a computer to function as an apparatus for having a server hold obfuscated data obtained by obfuscating data as a result of converting a character code included in the data, the program causing the computer to function as: a mapping information storing section for storing mapping information indicating that a second glyph is mapped to the character code, wherein the second glyph is a glyph different from a first glyph identified by the server based on the character code and having the same width as the first glyph; a receiving section for receiving, from the server, the obfuscated data obtained by obfuscating the data as a result of converting the character code included in the data to a character code to which a glyph identified by the server based on the character code included in the data is mapped as the second glyph in the mapping information; an identification hardware device for identifying the glyph mapped as the second glyph in the mapping information to a character code included in the obfuscated data received from the receiving section; and a display section for displaying the glyph identified by the identification hardware device.

According to the present invention, the possibility of data leakage to a server side in having the server hold data can be reduced and layout disruption when the data is received from the server and displayed can be prevented.

The present invention may be implemented all in hardware or all in software. It can also be implemented both in hardware and software. Further, the present invention can be implemented as a computer, a data processing system, or a computer program. This computer program can be stored on a computer-readable medium and provided. Here, as a medium, an electronic, magnetic, optical, infrared or semiconductor system (device or equipment), or a propagation medium is considered. Further, as the computer-readable medium, a semiconductor or solid-state storage device, a magnetic tape, a removable computer diskette, a random access memory (RAM), a read-only memory (ROM), a rigid magnetic disk, and an optical disk are exemplified. Examples of optical disks so far include compact disk read-only memory (CD-ROM), compact disk read/write (CD-R/W), and DVD.

While the present invention has been described with respect to the embodiment, the technical scope of the present invention is not limited to the aforementioned embodiment. It will be obvious to those skilled in the art that various changes and modifications can be made without departing from the sprit and scope of the present invention.

What is claimed is:

1. An apparatus for having a server hold obfuscated data obtained by obfuscating data as a result of converting a character code included in the data, the apparatus comprising:
    a mapping information storage device for storing mapping information indicating that a second glyph is mapped to the character code, wherein the second glyph is a glyph different from a first glyph identified by the server based on the character code and having a width identical to the first glyph;
    a receiving hardware device for receiving, from the server, the obfuscated data obtained by obfuscating the data as a result of converting the character code included in the data to a character code to which a glyph identified by the server, based on the character code included in the data, is mapped as the second glyph in the mapping information;
    an identification hardware device for identifying the glyph mapped as the second glyph in the mapping information to a character code included in the obfuscated data received from the receiving hardware device;
    a display for displaying the glyph identified by the identification hardware device,
    a definition information storage device for storing definition information defining, for a glyph width, a plurality of glyphs having the width; and
    a generation apparatus for generating the mapping information by mapping a glyph other than the first glyph among the plurality of glyphs, defined for a width of the first glyph in the definition information, to the character code as the second glyph instead of the first glyph identified by the server based on the character code, wherein the generation apparatus uses a selection method according to an attribute of the data to select the glyph other than the first glyph from among the plurality of glyphs defined for the width of the first glyph in the definition information.

2. The apparatus according to claim 1, further comprising:
an acquisition hardware device for acquiring the data according to a user operation;
a font applying device for obfuscating the data as a result of converting a character code included in the data acquired by the acquisition hardware device to a character code to which a glyph identified by the server based on the character code included in the data is mapped as the second glyph in the mapping information; and
a sending hardware device for sending the server the obfuscated data obtained by the obfuscation logic obfuscating the data.

3. The apparatus according to claim 1, wherein the generation apparatus further generates the mapping information for each type of character according to an attribute of the data.

4. A method of having a server hold obfuscated data obtained by obfuscating data as a result of converting a character code included in the data, the method comprising:
storing, by one or more processors, mapping information indicating that a second glyph is mapped to the character code, wherein the second glyph is a glyph different from a first glyph identified by the server based on the character code and having a width identical to the first glyph;
receiving, from the server, the obfuscated data obtained by obfuscating the data as a result of converting the character code included in the data to a character code to which a glyph identified by the server based on the character code included in the data is mapped as the second glyph in the mapping information;
identifying, by one or more processors, the glyph mapped as the second glyph in the mapping information to a character code included in the obfuscated data received from the server;
displaying, on a display, the identified glyph;
storing, by one or more processors, definition information defining, for a glyph width, a plurality of glyphs having the width; and
generating, by one or more processors, the mapping information by mapping a glyph other than the first glyph among the plurality of glyphs, defined for a width of the first glyph in the definition information to the character code as the second glyph instead of the first glyph identified b the server based on the character code wherein said generating the mapping information generates the mapping information for each type of character according to an attribute of the data.

5. The method according to claim 4, further comprising:
acquiring, by one or more processors, the data according to a user operation;
obfuscating, by one or more processors, the data as a result of converting a character code included in the data to a character code to which a glyph identified by the server based on the character code included in the data is mapped as the second glyph in the mapping information; and
sending, by one or more processors, the server the obfuscated data.

6. The method according to claim 4, wherein said generating the mapping information is performed using a selection method according to an attribute of the data to select the glyph other than the first glyph from among the plurality of glyphs defined for the width of the first glyph in the definition information.

* * * * *